United States Patent Office 3,487,747
Patented Jan. 6, 1970

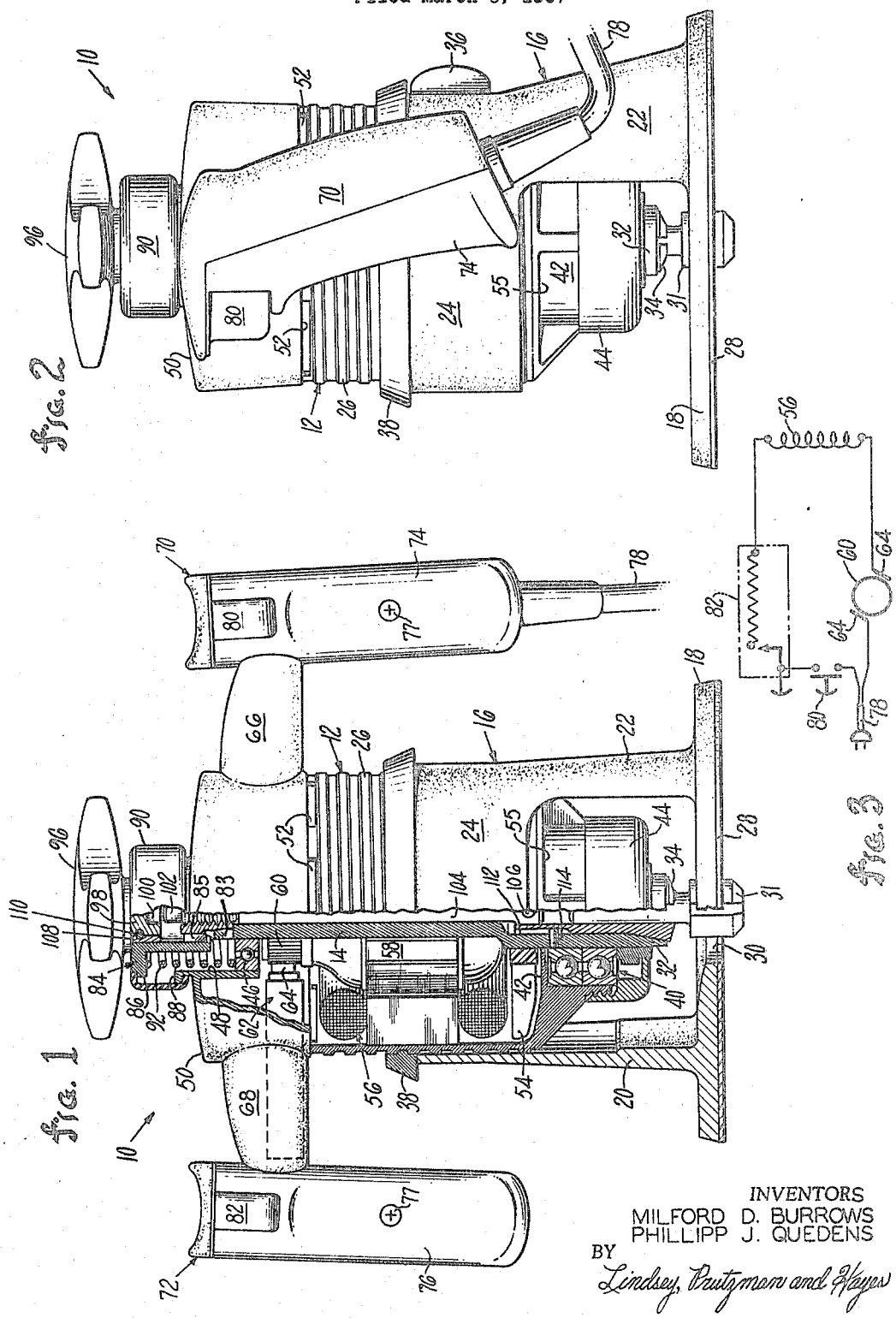

3,487,747
ROUTER HAVING CUTTING TOOL RELEASE MEANS
Milford D. Burrows, Avon, and Phillipp J. Quedens, Newington, Conn., assignors to The Stanley Works, New Britain, Conn., a corporation of Connecticut
Filed Mar. 8, 1967, Ser. No. 621,601
Int. Cl. B23c 1/20, 3/00, 7/00
U.S. Cl. 90—11
9 Claims

ABSTRACT OF THE DISCLOSURE

The electric router of this invention includes an axial slip coupling having a rotary knob mounted for axial movement at the top of the router for selectively unlocking and locking a chuck upon turning the knob in a depressed operative position. The router further includes twin switch handles actuable in a two hand operation for operating normally open motor control switches connected in series.

This invention generally relates to electric routers and specifically concerns an improved router having a knob operated interlock arrangement which is quick and easy to operate for locking and unlocking a chuck during installation and changing of cutting tools.

Another object of this invention is to provide a router of the above described type particularly suited to permit safe and easy removal and installation of router bits without the use of any separate tools which is so often inconvenient and time consuming.

A further object of this invention is to provide an electric router having an improved switch handle structure which is comfortable in use and provides a safety feature such that both hands of an operator must be removed from the cutting tool before the router can be energized.

Another object of this invention is to provide an improved router characterized by economy of manufacture and assembly and by a rugged construction for dependable operation over a long service life.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawing:

FIG. 1 is a front elevational section view, partly broken away, showing a preferred embodiment of a router constructed in accordance with this invention;

FIG. 2 is a side elevational view, partly broken away, of the router of FIG. 1, and FIG. 3 is a schematic view of an electrical circuit for the router of FIG. 1.

Referring now to the drawing in detail, a preferred embodiment of a power driven router 10 constructed in accordance with this invention is shown comprising a motor unit 12 having an elongated central motor shaft or armature 14 supported in a vertical position within a base 16.

More specifically, the base 16 includes a platform 18 and a pair of upright posts 20, 22 secured thereto and supporting a cylindrical upper base portion 24 for slidably receiving a threaded cylindrical casing 26 of the motor unit 12. The above mentioned parts of the base 16 are preferably cast as a single piece, and a flat work engaging plate 28 formed of any suitable non-marring material is shown attached to the bottom of the platform 18. An opening 30 is formed in platform 18 and in its bottom plate 28 through which a cutting tool 31 can extend to engage a workpiece for grooving, profiling and similar workforming operations.

In the specific illustrated embodiment, the armature 14 is of tubular construction and has an enlarged lower end portion 32 for receiving a conventional collet or chuck 34 for supporting the cutting tool 31. To position the cutting tool 31 at a desired height relative to the material to be worked, adjustable locking means 36 is provided in the upper base portion 24 for securing the motor unit 12 in a selected position within the base 16, and an adjusting ring 38 is threadably attached to casing 26 and seated upon the upper axial end of base 16 to provide a controlled depth of cut in accordance with well-known techniques. The details of locking means 36 are fully described in United States Patent 2,562,143 issued in the name of J. H. Goffrey et al. and assigned to the assignee of this invention.

The lower end portion 32 of armature 14 is journaled within a duplex ball bearing assembly 40 snugly mounted on a lower end of motor unit 12 within a bearing housing 42 having a protective cap 44 screwed onto it, and an upper end portion of armature 14 is supported for rotation within a ball bearing assembly 46 suitably mounted within a cylindrical chamber 48 centrally defined in the upper part of the motor unit 12 by a top cover portion 50 thereof which is integral with the threaded casing 26.

A series of peripheral air inlet passages 52 are provided in the motor unit 12 at the juncture of its casing 26 and top cover portion 50, and a plastic fan 54 is fixed to the lower end portion 32 of armature 14 for drawing air in through the inlet passages 52 and exhausting it through air outlet passages such as at 55 in the lower end of the motor unit 12 whereby chips and other particles are blown away from the cutting tool 31 upon operation of the router 10 while at the same time providing cooling air for the drive motor.

The drive motor is a conventional high speed electrical motor having a field 56, suitably secured to the casing 26, and a rotor 58 of a wound rotor construction with an armature commutator 60 at the upper end of the motor unit 12 wherein a pair of commutator brush assemblies 62 (only one being shown in the drawing) are provided, with each assembly having a brush such as at 64 in engagement with the armature commutator 60 for supplying power to the armature in a conventional manner.

A pair of arms 66, 68 are integrally formed with the motor unit 12 to extend outwardly of its top cover portion 50 in generally opposite radial directions for supporting a pair of handle halves 70, 72. The latter are preferably formed with pockets and have suitable caps 74, 76 of plastic construction, e.g., secured within open ends of the handle halves 70, 72 by machine screws such as at 77 to form smoothly contoured handle parts which are firmly and comfortably grasped for easy manipulation of the router 10. By positionally arranging the radial arms 66, 68 to extend radially outwardly of the armature commutator 60, the brush assemblies 62 can be housed within the radial arms 66, 68 such that brushes 64 can be of extra long length sufficient to effect a significantly extended operating life without brush replacement.

For ensuring safe handling of the router 10 even by an inexperienced operator, dual trigger-type switch handles are provided for ensuring that both hands of an operator are safely removed from the cutting tool before the drive motor can be energized.

More specifically, a power cord 78 for connection to a suitable source of electrical power is shown received within an opening in the base of one of the handle parts, and suitable leads are provided for connecting a normally open, push button ON-OFF switch 80 in series with a normally open, variable speed control switch 82 between the power cord 78 and the armature brushes 64 as seen in FIG. 3. If desired, the variable speed switch 82 can be a conventional silicon controlled rectifier type connected to the motor in accordance with well known techniques. The ON-OFF switch 80 is shown mounted on handle cap 74 with the variable speed switch 82 provided on the other handle cap 76 such that with switches 80, 82 in series, both hands of an operator must be positioned on the handle parts to close the switches and operate the router 10 thereby providing a highly desirable safety feature while also effecting speed regulation of the drive motor through the variable speed switch 82. The above described control over the drive motor also promotes safety in that the variable speed switch 82 may be used to stop the motor and thus reduce its coast time.

In accordance with another aspect of this invention, a self-gripping lock arrangement is provided to permit safe and easy installation and changing of the router bits without the use of any separate tools. In this regard, the upper end of the armature 14 is shown having a hexagonal nut 83 seated thereon for receipt within a locking member or sleeve 84 having a central opening 85 of hexagonal cross section conforming to the armature hex nut 83. The upper portion of sleeve 84 has an annular radial projection 86 axially spaced above a radial lip 88 integrally formed on the top cover portion 50 of casing 26, and an imperforate cuff or collar 90 of resilient and durable material such as urethane rubber is fitted onto and extended over projection 86 and the radial lip 88 for maintaining the above mentioned parts in assembled relation while at the same time providing a tight closure to prevent entry of sawdust, chips etc. into the top cover portion 50 of the casing 26.

The collar 90 is normally maintained in an extended condition with the bottom of sleeve 84 in adjacent but axially spaced relation to the armature hex nut 83 by means of a compression spring 92 coiled about the sleeve 84 with upper and lower ends of the spring 92 respectively bearing against radial projection 86 and the outer race of the ball bearing assembly 46. By this arrangement, the biasing force of spring 92 maintains sleeve 84 against rotation while providing the further advantage of accommodating variations within ordinary manufacturing tolerances of the axially stacked components as well as for thermal expansion thereof along the vertical axis of the router 10.

For locking and unlocking chuck 34 relative to the armature 14, the top of router 10 is provided with a rotary knob 96 shown having a downwardly extending drive member or center post 98. The center post 98 is preferably formed with a square socket 100 in its lower end for receiving an exposed squared end 102 formed on a threaded upper end portion of a chuck extension member or operating rod 104. The latter is threadably secured to the armature hex nut 83 and held thereby in a vertical position with an enlarged lower end of the operating rod 104 being coaxially attached, e.g., by a removable pin 106 within an upper axial end of the chuck 34 which is thus adapted for replacement for different work forming operations. The center post 98 of the knob 96 is mounted for rotation within a bushing 108 suitably secured within the sleeve 84, and the post 98 is retained against axial movement relative to bushing 108 and sleeve 84 by any suitable means such as the snap ring 110 whereby when the spring 92 is in its normally extended position shown in FIG. 1, the knob 96 is in an inoperative position, as illustrated, just above the squared end 102 of the operating rod 104.

The cooperating parts of the above described interlock arrangement are preferably dimensioned such that center post 98 bottoms on the armature hex nut 83 to provide a stop upon pressing knob 96 downwardly, the provision of the rubber collar 90 readily permitting simultaneous axial movement of the sleeve 84 and the knob 96.

To prevent spinning of the chuck 34 within the armature 14 during operation of the router 10 as well as to ensure proper tightening and unlocking of the chuck 34 relative to the cutting tool 31, a longitudinal keyway 112 is machined in the chuck 34 for receiving a projecting end portion of a lock pin 114 to rotatably secure the chuck 34 to the armature 14, the lock pin 114 being retained in a sidewall opening in the lower end portion 32 of the armature 14. The keyway 112 is suitably tapered and dimensioned relative to the lock pin 114 to ensure proper release and locking action of the cutting tool 31 upon axial movement of the chuck 34 relative to the armature 14 while yet permitting complete removal of the chuck 34 by unscrewing its operating rod 104 to permit replacement of the chuck. By virtue of the above described internal locking of the router bits, the exposed unsupported length of the cutting tool is minimized to effectively resist lateral loads applied thereto to further ensure long reliable service under rugged operating conditions.

In summary, depression of knob 96 forces sleeve 84 downwardly against the spring force such that the armature hex nut 83 is automatically locked by sleeve 84 simultaneously upon post 98 being fitted over the operating rod 104 with its exposed squared end 102 received in the socket 100 for rotatably coupling the operating rod 104 to the knob 96. While maintaining knob 96 in its depressed or operative position, the operator need only turn the rotary knob 96 for unlocking and tighteing the chuck 34 in a one-handed operation for quick and easy installation and replacement of router bits. The above described parts thus coact as an axial slipcoupling with the sleeve 84 acting as an anti-rotation retaining member for the armature hex nut 83 while the operating rod 104 and the chuck 34 are axially extended and withdrawn as a unit relative to the armature 14 in response to rotation of the knob 96 in its operative position for effecting locking and unlocking of the cutting tool.

A router of the above described construction provides a new and simplified arrangement wherein cutting tools may be quickly and easily replaced and wherein the chuck itself is replaceable without major dismantlement of the router. The latter is of a rugged construction which provides for economical manufacture and assembly, ease of handling and safety of operation even by the relatively inexperienced.

As will be apparent to persons skilled in the art, various modifications and adaptations of the structure above described will become readily apparent without departure from the spirit and scope of the invention, the scope of which is defined in the appended claims.

The embodiments of the invention in which an exclusive property or privilege is claimed are defined as follows:

1. An electric router having a replaceable cutting tool and comprising a generally cylindrical casing having upper and lower ends, an electrical motor received within said casing and having an armature rotatably mounted coaxially thereof, a chuck in concentric relation to said armature at said lower end of said casing, said chuck being axially movable relative to said armature and cooperating therewith for releasably securing a cutting tool, and means for extending and retracting said chuck axially of said casing, said means including a manually actuatable rotary knob mounted on said upper end of said casing for movement axially thereof between a normal inoperative position and an operative position wherein a cutting tool is automatically released and secured upon rotation of said knob.

2. An electric router having a replaceable cutting tool and comprising a generally cylindrical casing having upper and lower ends, an electrical motor received within said casing and having a tubular armature rotatably mounted coaxially thereof, a chuck at said lower end of said casing received within said armature for selective relative axial movement and cooperating therewith for releasably securing a cutting tool, and slip coupling means for axially moving said chuck relative to said armature and including a rotary knob mounted on said upper end of said casing for movement axially thereof between a normal inoperative position and an operative position wherein a cutting tool is automatically released and secured upon rotation of said knob, said slip coupling means further including a drive member fixed to and extended downwardly of said knob, a driven member on one of said armature and chuck members engageable with said drive member for simultaneous rotation therewith when said knob is in said operative position, a supporting member mounted on the other of said armature and chuck members and threadably secured to said driven member, and an anti-rotation retaining member cooperating with said drive member and movable into locking engagement with said supporting member upon axial movement of said knob into said operative position.

3. The router of claim 1 wherein said chuck is rotatably secured to said armature, and wherein said chuck is rotatable simultaneously with said knob when in said operative position for axial extension and retraction relative to said armature for automatically releasing and securing a cutting tool.

4. The router of claim 1 further including a resilient imperforate rubber collar attached to said upper end of said casing for holding said knob in assembled relation thereto and providing a closure for said upper end of said casing.

5. An electric router having a replaceable cutting tool and comprising a generally cylindrical casing having upper and lower ends, an electrical motor received within said casing and having a tubular armature rotatably mounted coaxially thereof, a chuck at said lower end of said casing received within said armature for selective relative axial movement and cooperating therewith for releasably securing a cutting tool, an elongated operating rod secured to said chuck and extending upwardly thereof through said tubular armature, a nut seated on an upper end of said armature and threadably connected to an upper end portion of said operating rod permitting replacement of said chuck, a rotary knob mounted on said upper end of said casing for movement axially thereof between a normal inoperative position and an operative position wherein a cutting tool is automatically released and secured upon rotation of said knob, a center post supported on said knob for rotary driving engagement with said upper end portion of said operating rod when said knob is in said operative position, and an anti-rotation retaining member cooperating with said center post of said knob and movable into locking engagement with said nut upon movement of said knob into said operative position.

6. The router of claim 5 wherein said operating rod includes an exposed polygonal end projecting above said nut on said armature, and wherein said center post of said knob includes a socket formed therein conforming to said polygonal end of said operating rod for receiving the same and rotatably coupling said chuck to said knob when the latter is moved into said operative position.

7. The router of claim 5 wherein said center post of said knob is rotatably mounted coaxially within said anti-rotation retaining member and fixed against axial movement relative thereto, and wherein said router further includes a rubber collar attached to and surrounding said anti-rotation retaining member and fixed to said upper end of said casing, and a spring concentric within said collar and seated between said anti-rotation retaining member and said upper end of said casing and continuously urging said knob toward said inoperative position.

8. The router of claim 1 wherein said armature is of tubular construction and wherein said chuck is received within said armature for selective relative axial movement.

9. The router of claim 1 wherein said means for extending and retracting said chuck further includes an operating rod for said chuck, support means for said rod, and locking means carried by said knob engageable with said support means when said knob is in operative position for locking the support means against movement and effecting axial movement of said rod and chuck members relative to said armature upon rotating said knob in its operative position.

References Cited

UNITED STATES PATENTS

| | | | |
|---|---|---|---|
| 2,337,400 | 12/1943 | Maute | 279—53 |
| 2,842,173 | 7/1958 | Turner | 144—136 |
| 3,027,812 | 4/1962 | Courtois | 90—11.1 |
| 3,038,386 | 6/1962 | Parske et al. | 90—11.1 |
| 3,220,313 | 11/1965 | Schroeder | 90—11.1 |

ANDREW R. JUHASZ, Primary Examiner

GIL WEIDENFELD, Assistant Examiner

U.S. Cl. X.R.

90—12; 144—134, 136